Aug. 19, 1930. H. I. A. DORNER Re. 17,775

INTERNAL COMBUSTION ENGINE

Original Filed Feb. 15, 1926

INVENTOR

Hermann I. A. Dorner

Whittemore Hulbert

By Whittemore & Belknap

ATTORNEYS

Reissued Aug. 19, 1930 Re. 17,775

UNITED STATES PATENT OFFICE

HERMANN I. A. DORNER, OF DETROIT, MICHIGAN, ASSIGNOR TO UNION GUARDIAN TRUST COMPANY, OF DETROIT, MICHIGAN, A CORPORATION OF MICHIGAN, AS TRUSTEE

INTERNAL-COMBUSTION ENGINE

Original No. 1,662,106, dated March 13, 1928, Serial No. 88,409, filed February 15, 1926. Application for reissue filed April 22, 1929. Serial No. 357,257.

The invention relates to internal combustion engines of the Diesel type and has for its object first, the introduction of a sufficient quantity of air and the maximum commingling of the same with the ejected fuel; second, the avoidance of the drainage of any portion of the fuel into contact with the lubricated walls of the cylinder; third, to obtain other advantages as hereinafter set forth.

Figure 1:
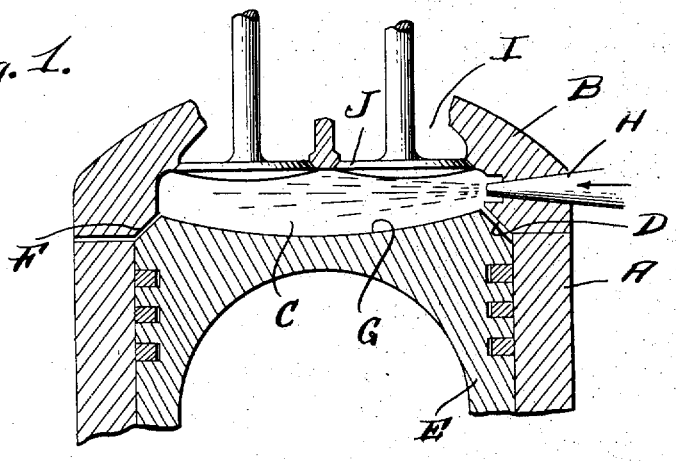
Figure 1 is a central longitudinal section through a portion of the cylinder and piston.
Figure 3:
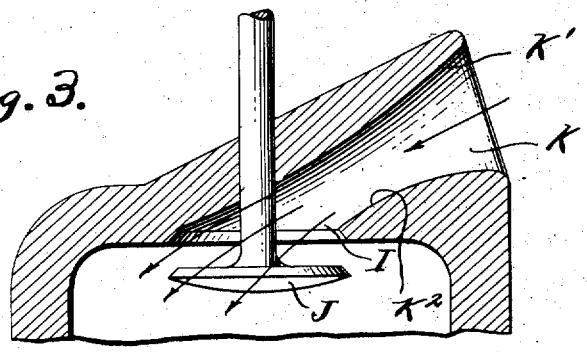
Figure 3 is a vertical section on the line 3—3 of Figure 2.
Figure 2:
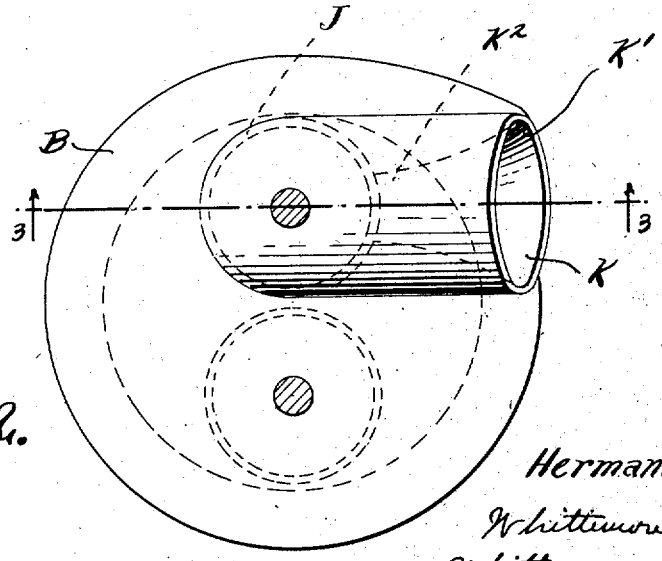
Figure 2 is a horizontal section therethrough.

With engines of the Diesel type where the fuel is directly injected into the highly compressed air, it is important to quickly obtain a thorough commingling of these elements. It also frequently happens that some portions of the fuel will collect on the walls and drain into the space between the piston and cylinder. This is objectionable both because of loss in efficiency and also because of the dilution of the lubricant. To overcome these defects I have devised a construction as follows:

The cylinder A is provided with a head B having a recess C therein somewhat less in diameter than the cylinder and connected with the latter by the conical portion D. E is the piston having the annular conical portion F parallel to the portion D and the top portion G preferably slightly cupped. The recess C thus forms the clearance space in which the air is compressed and into which the fuel is injected through a nozzle H. The air is introduced through a port I which is controlled by the valve J.

With the construction as thus far described, when fuel is injected, this occurring near the completion of the compression stroke of the piston, it is separated from the lubricated walls of the cylinder by an air pocket formed between the conical portions D and F. The clearance between these conical walls when the piston is at the end of its stroke, is comparatively slight and therefore the displacement of air occurring at the end of the stroke will assist in excluding the fuel.

To obtain maximum power and efficiency it is desirable to introduce the maximum quantity of air into the cylinder as nearly as possible at atmospheric pressure and it is equally important to effect a thorough commingling of the compressed air with the atomized fuel. Both of these results are obtained by my improved construction as follows:

The air inlet port I controlled by the valve J is preferably located at one side of the axis of the cylinder and the passage K connecting to this port is inclined to said axis and tangentially to the cylinder. This will cause the incoming current of air to travel in a spiral course throwing the whole mass into rapid revolution which continues during the succeeding compression stroke. To still further increase the velocity and the quantity of air so introduced, the passage K is of venturi form and preferably free from obstructions. Thus, as shown, the passage K is provided with the flaring inlet portion K′ and the port I forms a flaring outlet into the cylinder while intermediate these portions is the restricted throat portion $K^2$. This will cause the air entering through the passage K to attain a high velocity in the throat $K^2$ which in passing through the port I will cause a rapid whirling motion within the cylinder.

The area A of the valve opening is made greater than the sectional area at the throat of the venturi $K^2$ so that no obstruction is offered to the passage of the incoming air and the direction of the flow of incoming air is unchanged until after the valve has been passed. The velocity of the air stream is increased during its passage from K′ to $K^2$ and from $K^2$ remains approximately the same in passing through the valve and entering the whirling column of air in the cylinder.

Thus, during the compress stroke the air in the cylinder which is finally forced into the recess C continues its revolution which will effect a thorough commingling with the fuel spray from the nozzle H.

As clearly indicated in the drawings, the fuel is injected through the nozzle H in a direction transverse to the rotating mass of air or substantially radial with respect to the axis of the cylinder. This causes the fuel spray from the nozzle to penetrate the rotating body of air from periphery to axis and as the length of the latter is relatively short at point of high compression, the entire air volume will be penetrated by the spray. This results in a most thorough commingling of the fuel and air which so increases the rapidity of combustion as to permit the motor to operate at high speed.

What I claim as my invention is:

1. In an internal combustion engine of the Diesel type, the combination of a cylinder having a valve controlled inlet port in the head thereof and a single main inlet passage through said head communicating with said port and arranged to direct the incoming charge tangentially of the cylinder and oblique to the axis thereof.

2. In an internal combustion engine of the Diesel type, the combination of a cylinder having a valve in the head thereof eccentric to the axis of said cylinder and a single main inlet passage controlled by said valve and arranged to direct the incoming charge obliquely to the axis of said valve and tangentially of said cylinder.

3. An internal combustion engine of the Diesel type comprising a cylinder having a valve in the head thereof at one side of the axis of the cylinder and an inlet passage of venturi form controlled by said valve, the axis of said passage being oblique to the axis of the valve and tangential in relation to the cylinder.

4. An internal combustion engine of the Diesel type comprising a cylinder having a valve in the head thereof arranged at one side of the axis of the cylinder and an inlet passage through said head controlled by said valve, said passage being of venturi form and having a rectilinear axis oblique to the axis of the valve and tangential to the cylinder, the throat of said venturi being of an area less than the port opening for said valve.

5. An internal combustion engine of the Diesel type comprising a cylinder provided with a single main inlet passage of venturi form having its axis directed tangentially of the cylinder.

6. An internal combustion engine of the Diesel type comprising a cylinder provided with a single main inlet passage of venturi form eccentric and oblique to the axis of said cylinder.

7. In an internal combustion engine, the combination with a cylinder and piston, of a single air inlet arranged to direct a suction induced incoming stream of air in a spiral course within the cylinder to impart a high rotational velocity thereto, and a fuel nozzle arranged to direct the fuel within said cylinder transversely of the rotating mass.

8. The method of operating internal combustion engines comprising the directing of a suction induced air stream in a spiral course within the cylinder to impart a high rotational velocity thereto sufficient to continue rotation of the entire mass during compression, compressing and injecting the fuel radially into the compressed and still rotating body of air to effect a thorough commingling.

9. The method of operating internal combustion engines which consists in introducing a rectilinear single column high velocity air stream into the cylinder in a tangential direction and oblique to the cylinder axis to impart a spiral movement thereto and a rotation of the entire volume introduced which continues during compression, compressing and injecting the fuel into the cylinder transversely of the rotating air to penetrate the same and to effect a thorough commingling.

10. The method of operating internal combustion engines comprising the introduction by suction of a stream of air into the cylinder in a manner to cause acceleration upon entrance and travelling therein in a spiral direction, compressing the rotating air and injecting liquid fuel to penetrate the rotating air and effect a thorough commingling.

11. The method of operating an internal combustion engine comprising inducing a high velocity movement of air in an uninterrupted rectilinear stream and introducing the same into the cylinder in a direction causing a continued spiral movement therein, compressing the rotating air and injecting atomized liquid fuel into the rotating compressed air to cause penetration.

In testimony whereof I affix my signature.

HERMANN I. A. DORNER.